Figure 1:
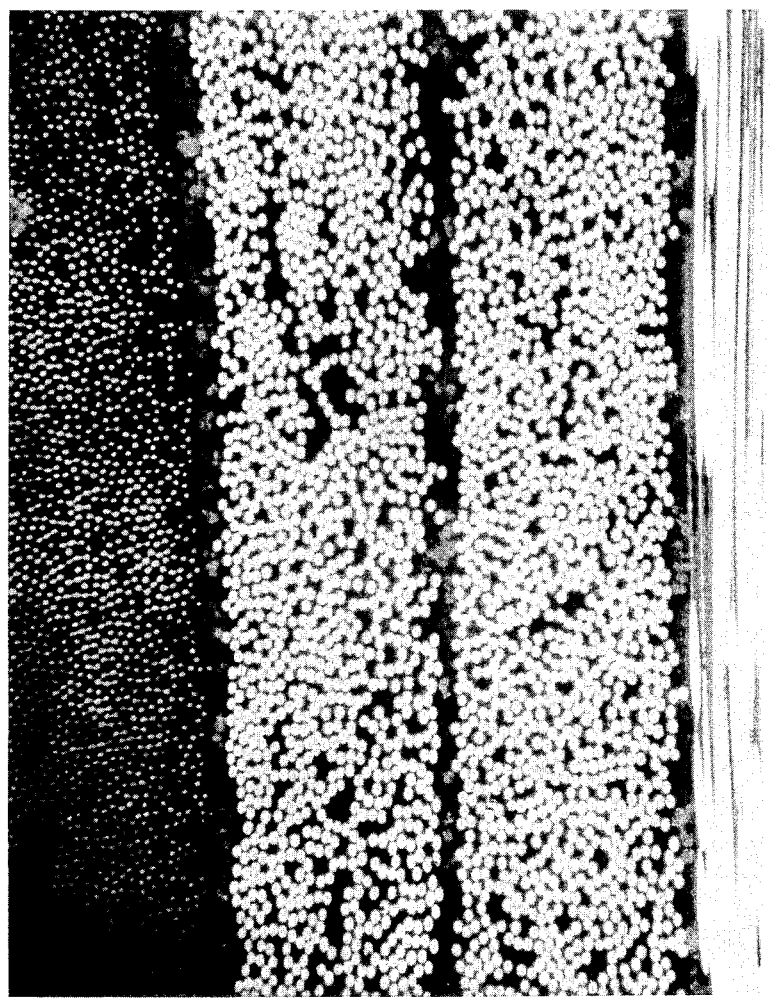

United States Patent [19]

Maranci et al.

[11] Patent Number: 4,957,801
[45] Date of Patent: Sep. 18, 1990

[54] ADVANCE COMPOSITES WITH THERMOPLASTIC PARTICLES AT THE INTERFACE BETWEEN LAYERS

[75] Inventors: Artun Maranci, Westport; Steven L. Peake, Ridgefield; Stanley S. Kaminski, Stamford, all of Conn.

[73] Assignee: American Cyanamid Company, Stamford, Conn.

[21] Appl. No.: 353,277

[22] Filed: May 17, 1989

[51] Int. Cl.$^5$ .......................... B32B 5/28; B32B 5/30
[52] U.S. Cl. .................................... 428/147; 428/327; 428/332; 428/340; 428/902
[58] Field of Search ............... 428/147, 327, 902, 332, 428/340

[56] References Cited

U.S. PATENT DOCUMENTS 3,472,730 10/1969 Frigstad ............................. 428/295
4,539,253 9/1985 Hirschbuehler et al. ........... 428/248
4,604,319 8/1986 Evans et al. ........................ 428/290

FOREIGN PATENT DOCUMENTS 0274899 7/1988 European Pat. Off. .

Primary Examiner—Alexander S. Thomas
Attorney, Agent, or Firm—Gordon L. Hart

[57] ABSTRACT

The invention relates to prepregs of fiber-reinforced thermosetting resin that have a coating comprising thermoplastic particles on one or both outer surfaces. Upon lamination of the prepregs into a composite, the layer comprising thermoplastic particles at the surface of the prepreg is formed into a discrete resin layer in the composite at the interface between fiber-reinforced thermosetting resin layers. The laminated composite materials have improved toughness and impact strength due to the thermoplastic particulate material at the interface and yet the composites still retain desired mechanical properties under hot/wet conditions.

7 Claims, 1 Drawing Sheet

ADVANCE COMPOSITES WITH THERMOPLASTIC PARTICLES AT THE INTERFACE BETWEEN LAYERS

The invention relates to fiber-reinforced resin matrix prepregs coated with particulate thermoplastic resin and to the laminated composites which are made therefrom. Such composites are found to have significantly increased toughness and improved resistance to impact damage due to the formation of a discrete layer comprising thermoplastic resin at the interface between fiber reinforced thermosetting resin layers in the composite.

Fiber-reinforced resin matrix composites are widely accepted for use as high strength, low weight engineering materials to replace metals in aircraft structural applications. These composite materials are made by laminating prepregs of high strength fibers such as glass, graphite, boron or the like in a matrix of thermosetting resin. Important properties of such composites are high strength and stiffness and low weight. Due to the inherent brittleness of the thermoset resins these composite materials are susceptible to damage by impact which causes delamination and consequent loss of strength.

An especially effective means for improving impact tolerance and delamination resistance of composites is the use of a ductile resin layer interleafed between the plies of a laminated composite. U.S. Pat. No. 3,472,730, R. A. Frigstad (Minnesota Mining and Manufacturing Company) Oct. 14, 1969 described a composite in which a film of thermosetting resin capable of greater elongation than the matrix resin is laminated onto a prepreg. To achieve this, the "separate exterior film" included (1) a thermosetting resin and (2) a modifying resin which constitutes no more than 50 weight percent of the film. The films had thicknesses from ½ to 4 mil. In specific examples, the film thicknesses were 3 mil and 1 mil and quantitative mechanical properties were reported only for the 3 mil thick films. In the case of the 3 mil thick films, the improvements in interlaminar peel strength were accompanied by severe losses of flexural strength and flexural modulus. Those losses and the added resin content make the use of such thick interleaf layers impractical for weight critical applications.

U.S. Pat. No. 4,604,319 to R. E. Evans described use of a thermoplastic interleaf in a composite for improving interlaminar strength and impact resistance. The interleaf essentially comprised a thermoplastic resin, and could also contain up to 40% of a modifying thermoset resin. Composites made with thermoplastic interleafs were found to have better hot/wet compression strengths than those made with thermosetting interleafs. However, composites with an interleaf had less compression strength than those with no interleaf.

U.S. Pat. No. 4,539,253, to K. R. Hirschbuehler et al described composites of fabric reinforced prepregs laminated with thermosetting interleaf layers. A thin, non-woven or woven fibrous mat or carrier was incorporated in the resin interleaf. This mat supports the interleaf during cure so that the interleaf layer remains continuous and integral through the cure.

A key feature of successful interleafing of composites is that the interleaf must maintain a discrete resin layer separating fiber layers in the finished laminate. Several means for maintaining the discrete resin layer during the cure and in the finished composite are known in the prior art as described above.

We have found that composites made with at least one layer of a prepreg which has been coated on one or both of its sides with a layer comprising thermoplastic particles (either mixed with a thermosettable resin or without any other resin), when cured surprisingly attains the continuous and integral discrete resin layer in which the thermoplastic resin is concentrated between fiber layers. The resulting composites have improved resistance to impact damage as well as other advantageous properties.

One object of our invention is to provide fiber-reinforced resin matrix composites having improved toughness and impact resistance, while maintaining suitable mechanical properties over a wide temperature range.

Another object is to provide fiber-reinforced resin matrix composites having the discrete resin interlayer with less added weight as compared to prior art composites interleafed with either thermoset or thermoplastic interleafs.

Still another object is to provide a fiber-reinforced resin matrix prepreg which comprises an outer layer of thermoplastic particles and retains the tack and drape which are desired handling characteristics of most prepregs but are not characteristic of most thermoplastic interleaf films.

We have found that one or more discrete resin layers can be incorporated into a fiber reinforced resin composite by applying a layer of thermoplastic powder to the surface of a prepreg that will be used in making the composite. The discrete resin interlayer that is obtained on lamination of this prepreg will improve interlaminar fracture toughness and impact resistance of the composite with little or no loss of in-plane properties such as compression strength, particularly under hot/wet conditions.

There is a need for reinforced resin composites that can provide a good balance of properties. Improvement of interlaminar toughness and impact resistance is desired without excessive increase of resin content and without serious loss of in-plane properties such as tensile strength, compression strength and modulus. Early interleafed composites had improved interlaminar toughness, but it was gained with some loss of in-plane properties such as flexural strength and modulus. Lessening of in-plane properties is related to the reduced volume percent of reinforcing fiber in the composite. Earlier thick interleafs increased the proportion of resin to fiber in the composite. To maintain good in-plane properties, very thin interleafs have been sought.

The difficulty of maintaining high fiber content, and thereby maintaining good in-plane properties of the composite when using interleafs can be illustrated by the example of composites made with light grades of carbon fiber. With thinner prepregs each interleaf layer adds a higher proportion of resin weight. For example, Grade 145 prepreg tape (i.e., prepreg containing 145 grams of fiber per square meter) has a thickness of approximately 5.5 mil and a resin content of approximately 35 weight percent. Even a very thin interleaf, for example 0.5 mil thick, will increase the weight by about 4-5%, and the per ply thickness is increased by about 10%.

When very thin interleaf layers are made using thermoset films such as those described by Frigstad, they do not produce discrete resin layers in the cured composite. Fibers of the prepreg are pushed into the interleaf during the lamination and curing process and the discrete resin layer is lost. When this happens, no increase of damage tolerance or resistance to delamination is obtained.

Our invention has the advantage that it can produce thin discrete resin interlayers (less than 1 mil) in the composite with minimum increase of total resin content. Composites embodying the invention have the improved interlaminar toughness and impact resistance that are typical of interleafed laminates, but do not have so much loss of in-plane properties usually associated with the use of thicker interleafs.

Prepregs of the invention have the advantage of much improved handling properties for making composites as compared with making composites using interleaf films. Because the particles at the prepreg surface are surrounded by the prepreg resin, tack of the coated prepreg surface is similar to that of the uncoated prepreg. And because the thermoplastic is in particulate form, the coated prepreg may be easily draped over complex curvatures before curing, sometimes difficult with thermoplastic interleaf films.

The amount of particulate thermoplastic resin in the coating on the prepreg must be sufficient to maintain a discrete resin layer on curing, but preferably should be no more than is needed, in order to keep the total resin content of the prepreg low. The optimum amount of particles at one prepreg surface will usually be in the range from about two to fifteen grams per square meter. In a composite, the thermoplastic particles usually will constitute about 20% to 80% of the volume of resin in the interply region of the composite between the fiber layers. Preferably, the amount of thermoplastic particulate should be in the range of 30 to 70 volume % in this region. The optimum amount will depend on the inherent toughness of the base matrix resin, the toughness of the particulate, as well as other factors. In the cured composite the matrix resin encapsulates the thermoplastic particle as an integral part of the discrete interply layer.

The thermoplastic particles should be large enough to prevent migration of particles from the interply region into the fiber reinforcing web during the process of making the prepreg and the composite. For making typical graphite fiber prepregs a particle diameter of 2 to 100 microns is suitable. The most preferred thermoplastic particle diameter for coating graphite fiber prepregs is in the range from 5 to 30 microns. The thermoplastic resin should also be thermally stable at the cure temperature of the laminate and at the use temperature of the final composite. In addition, the thermoplastic particle should be capable of forming a strong bond to the matrix resin at cure temperature.

The reinforcing filaments useful in the present invention include, but are not limited to, filaments composed of glass, carbon, graphite, silicon carbide, boron, aramid, polyester, polyamide, rayon, polybenzimidazole, polybenzothiazole, metal coated filaments such as nickel or silver coated graphite fiber or filament, combinations of such filaments, and the like.

Thermosetting resin compositions potentially useful as the matrix resin in the present invention include epoxy, bismaleimide, cyanate, polyimide, PMR-15, acetylene terminated polyimide, phthalocyanine and polybenzoxazole resins and the like.

A variety of thermosetting epoxy resin compositions as well as other thermosetting resins useful as matrix resins for making prepregs according to the invention are described in more detail in U.S. Pat. No. 4,604,319.

Bismaleimide resins which may be employed as the matrix resin include bismaleimides based on the monomers described in U.S. Pat. No. 4,604,319.

Thermoplastic resins which may be used as thermoplastic particles for making prepregs and composites embodying the invention include polyimides, polyetherimides, polyamideimide, polyamide, polyaramide, polyethersulfone, polyarylsulfone, polyetherketone, polycarbonate, polyester, polyarylene sulfide, polytetrafluoroethylene, or polybenzimidazole. Examples of polyimides include Kapton and Vespel resins sold by Du Pont, Matrimide 5218 sold by Ciba-Geigy, LaRC-TPI sold by Mitsui Toatsu or Upilex R sold by Ube Industries. The polyetherimides Ultem 1000, Ultem D5001 and HPA-2, as well as the Lexan polycarbonate resins, are sold by General Electric Company. Examples of polyethersulfones are Udel and Radel sold by Amoco and Victrex PES sold by ICI. Torlon polyamideimide is sold by Amoco. Examples of polyetherketones are Victrex PEEK sold by ICI and PEK sold by BASF. Carbazole polybenzimidazole is sold by Hoechst-Celanese.

There are many methods to manufacture prepregs containing particles of thermoplastic resins. An important feature of this invention is to form a resin layer, apart from the reinforcing fiber, comprising the thermoplastic particles at one or both surfaces of the prepreg and to prevent the particles from penetrating the fiber bundles.

In some preferred processes for making prepregs a coating of thermoplastic resin particles is applied to the surface of an existing prepreg. This can be done by a number of methods such as dry powder coating, fugitive carrier coating, or permanent carrier coating as described in more detail below.

I. DRY POWDER COATING (a) Electrostatic powder coating. A static charge is produced on a release paper and oppositely charged thermoplastic powder is attracted forming a coat of powder on the paper. The coating is then transferred to one or both sides of the prepreg.

(b) Dry-bar coating whereby dry powder is coated onto release paper using a roll over roll or knife over roll/plate coater similar to conventional adhesive coating techniques.

(c) Sifter coating whereby a mechanical sifter containing a mesh screen or sieve is used to deposit a uniform thickness of powder onto release paper or onto the prepreg itself.

(d) Brush/Tack coating whereby the prepreg on which a large quantity of powder has been deposited on one side, is carried under brushes which remove all but a thin layer of particles which adhere by the tack of the prepreg resin.

II. FUGITIVE CARRIER COATING (a) Solvent spray coating whereby a solution of the thermoplastic in a solvent is sprayed onto release paper or directly onto the prepreg and the thermoplastic is deposited as a powder when the solvent is evaporated.

(b) Slurry spray coating whereby a dispersion of the thermoplastic powder in volatile liquid is sprayed onto the prepreg surface, or on release paper, and the carrier is evaporated leaving a coat of particulate thermoplastic.

(c) Slurry overcoating whereby the slurry is metered onto previously coated prepreg or release paper using conventional coating techniques.

III. PERMANENT CARRIER COATING (a) A thermoset interleaf resin such as FM300I is loaded with thermoplastic particulate and then coated on the surface of a prepreg.

In those cases above when thermoplastic particles are first coated onto a separate release paper, the coating is then transferred onto one or both surfaces of a prepreg to deposit a uniform layer of particles on one or both sides of the prepreg.

The invention is described in more detail by reference to preferred embodiments as set forth in the following specific examples.

EXAMPLE 1

The selected unidirectional fiber-reinforced resin prepreg is Cycom 1808 (American Cyanamid Company) which has been made from epoxy matrix resin and MAGNAMITE AS4 (Hercules) graphite reinforcing fiber. This prepreg contains 145 grams per square meter of the fiber and 34±2 percent by weight of the matrix resin. For testing shear strain energy release rate, G2c, expressed as inch pounds per square inch, composites are made by stacking 24 plies of the selected prepregs unidirectionally with a starting shim at the midplane. Prepregs coated with thermoplastic particles are made by applying powdered thermoplastic Ultem 1000 polyetherimide thermoplastic resin over one side of the prepreg and brushing away the excess powder that has not adhered to the tacky surface of the prepreg. Particle size of the powdered thermoplastic is less than 75 microns. Particulate loading is approximately 5% of the total resin weight of the coated prepreg, i.e. about 3.9 gm./m$^2$ of thermoplastic resin particles. Three of these coated prepregs are placed in the stack with the powdered surface of one at the midplane and the other two at adjacent planes on each side of the midplane. The stack is then cured in an autoclave at 350° F. and 100 psi pressure for two hours to make the laminated composite. A control composite is made the same except the particle coated prepregs in the stack are replaced with uncoated prepregs.

The composites are cut to size and tested for G2c according to the test described by Russell, A. J. and Street, K. N. "Factors Affecting the Interlaminar Fracture of Graphite/Epoxy Laminates PROCEEDINGS OF THE FOURTH INTERNATIONAL CONFERENCE ON COMPOSITE MATERIALS, ICCM-IV, OCTOBER 1982, TOKYO." This test measures interlaminar toughness, i.e. resistance to interlaminar fracture under interplanar shear.

For the test composite made with the coated prepregs the measured G2c value is 15.7 in.-lb./sq. in. For the control composite, the G2c is 7.3 in.-lb./sq. in.

A cross section of the test specimen was examined by microscopy. In the region of the powder coated surfaces of the prepregs, the composite had discrete resin layers, of average thickness about 1 mil, composed of thermoplastic particles surrounded by the matrix resin. These discrete resin layers lie between the plies of fiber in the composite.

EXAMPLE 2

Composites were made and tested as described in Example 1 except the thermoplastic particles were powdered Victrex 4800P thermoplastic polyether sulfone resin (ICI) sieved to particle size less than 75 micron. G2c of the test composite was 13.8 in.-lb./sq. in., and of the control was 7.3 in.-lb./sq. in. Microscopic examination of the test specimen cross section showed discrete resin layers separating fiber layers where the powdered prepreg surfaces had been. Although the thermoplastic particles had completely dissolved in the matrix resin during cure, the discrete resin layer was nevertheless maintained.

EXAMPLE 3

Composites were made and tested as in Example 1 except the thermoplastic particles were of UPILEX R thermoplastic polyimide resin (UBE Industries, Japan). The average particle size was 12 microns diameter. G2c of the test composite was 10.8 in.lb/sq. in, and of the control was 7.6 in.-lb./sq. in. Microscopy detected discrete resin layers of 12–18 microns thickness separating fiber layers at the interfaces in the composite where powdered prepreg surfaces had been. The particles were not dissolved in the matrix resin and maintained their original size and shape.

EXAMPLE 4

A thermosetting resin composition is prepared by mixing
   120 parts by wt N,N,N',N'-tetraglycidal4-4'-diamino diphenyl methane,
   12 parts by wt polyether polyimide resin (General Electric ULTEM),
   20.2 parts by wt trimethylene bis(p-aminobenzoate), and
   80.8 parts by weight trimethylene bis(4-N-methylaminobenzoate).

A prepreg is made from this resin and Magnamite AS-6 graphite fiber. Fiber areal weight in the prepreg is 145 g/m$^2$ and the resin content is 34±2% of the prepreg weight. This prepreg is made into control composites and tested as in Example 1. Identical prepregs are coated with thermoplastic particles as described in Example 1 using the 12 micron diameter Upilex R thermoplastic particles described in Example 3. Composites are made from the coated prepregs and tested as in Example 1. The G2c value measured for the composite made with thermoplastic particles is 17.1 in.-lb./sq. in. and for the control composite is 9.7 in.-lb./sq. in. Microscopic examination of the composites reveals discrete resin layers of 12-18 micron thickness separating fiber layers at the planes where thermoplastic resin particles had been applied to the prepreg surface. The particles were undissolved and retained their original size and shape in the composite and occupied 25% by volume in the discrete resin layer. In the drawings, FIG. 1 is a photomicrograph of a cross section of a compositemade according to this example, showing three discrete resin layers containing particles of thermoplastic resin and separating layers of the fiber reinforced matrix.

EXAMPLE 5

Composites were made as in Example 4 except the particles were Torlon 4000TF thermoplastic polyamideimide resin particles of average diameter between 2 and 12 microns. G2c for the composite made with thermoplastic particles was 14.9 in.-lb./sq. in. and for the control composite was 9.7 in.-lb./sq. in. Microscopic examination of the composite showed 12-18 micron thick discrete resin layers with undissolved resin particles, like those in Example 4.

EXAMPLE 6

The selected fiber reinforced resin prepreg is Cycom 3100 (American Cyanamid Company) which is made from bismaleimide thermosetting resin as the matrix and MAGNAMITE IM 6 (Hercules) as the reinforcing fiber. Fiber weight is 145 g/m² and resin content is 34±2% by wt. Composites are made and tested as in Example 1 but using this prepreg and using Matrimide 5218 (Ciba Geigy) thermoplastic polyimide resin particles of size less than 75 microns. The prepregs were stacked as in Example 1 but the stacks were cured in an autoclave at 350° F., 85 psig pressure for four hours, and then post cured at 440° F., unrestrained, for four hours.

G2c of the test composite made with thermoplastic particles measured 8.3 in.-lb./sq. in. while that of the control composite measured 5.1 in.-lb./sq. in. Microscopy revealed discrete resin layers separating fiber layers at planes in the composite where the powdered thermoplastic particles had been applied to the prepreg. The discrete resin layers were 10 to 25 microns in thickness. Although the thermoplastic resin particles were dissolved in the cured composite, a distinct phase structure was observed within boundaries of the original particles.

EXAMPLE 7

The selected unidirectional fiber-reinforced prepreg is the same as that used in Example 4. The prepreg having a coat of UPILEX R thermoplastic particles, is made as in Example 4 except the particle loading is 4.4% of the total resin in the prepreg (3.4 gm/m²). Composites are made from these prepregs for testing compression strength after impact (CSAI) and for testing unidirectional compression strength (UNI COMP) of the composites.

Composites for testing CSAI are made by stacking 32 plies of the prepreg to which particulate thermoplastic has been applied on one side and curing at 350° F., 100 psig fluid pressure for two hours. Control composites are made the same except using prepregs to which thermoplastic particles have not been applied. The CSAI test measures compression strength in KSI (psi x 10³) to failure after 1500 in.-lb./in. impact. The delamination area after impact is also measured.

Composites for testing UNI COMP are made by stacking eight plies of the coated prepreg unidirectionally and curing the composite at 350° F., 100 psig fluid pressure for two hours. Control composites are made the same from uncoated prepregs. The UNI COMP test measures compression strength of the composite and is conducted according to ASTM D-695 test specification. Samples are tested for UNI COMP at different temperatures as indicated in Table 1. Other samples are tested at several temperatures after they have been conditioned under water for two weeks at 160° F. These in Table 1 as "WET" conditioned samples.

Results of testing the composites are listed in Table 1. Thermoplastic particles occupied 30% by volume of the discrete resin layers in composites made with the coated prepregs.

TABLE 1

| PROPERTY | TEST COND. | WITHOUT PARTICLES | WITH PARTICLES |
|---|---|---|---|
| RESIN CONTENT | | 34.0 | 35.5 |

TABLE 1-continued

| PROPERTY | TEST COND. | WITHOUT PARTICLES | WITH PARTICLES |
|---|---|---|---|
| (wt %) | | | |
| CSAI (ksi) | 73 deg. F. | 41.2 | 51.0 |
| DELAMINATION AREA (sq. in.) | | 1.3 | 0.65 |
| UNI COMP (ksi) | 73 deg. F. | 244 | 230 |
| | 200 deg. F. | 198 | 182 |
| | 270 deg. F. | 140 | 147 |
| | 180 deg. F. (WET) | 175 | 176 |
| | 200 deg. F. (WET) | 131 | 117 |

EXAMPLE 8

A unidirectional fiber-reinforced resin prepreg tape, made with the thermosetting epoxy resin formulation described in Example 4 and Toho HTA-7 graphite fiber is used, having fiber content of 66% by wt and resin content of 34%. Fiber weight is 145 gm/m². This prepreg is coated with particles of Amoco Torlon 4000 TF thermoplastic polyamideimide resin by brush coating to a weight of 5.62 gm/m² of the thermoplastic on the prepreg. Composites of this coated tape were made as described in Example 7 for testing CSAI. Control composites were made from the uncoated prepreg for comparison. On testing, the composite made from the powder coated composites had CSAI of 45.5 ksi. For the control composite CSAI was 41.4 ksi.

EXAMPLE 9

A unidirectional fiber-reinforced resin prepreg tape like that in Example 8 was coated with Upilex U-PIP Type R thermoplastic polyimide resin powder. Composites were made from these prepregs as in Example 8 and tested for CSAI. The CSAI test results were 47.3 ksi for the composite made with powdered thermoplastic and 41.4 ksi for the control.

EXAMPLE 10

Composites were made and tested as in Example 8 in all respects except the fiber-reinforced resin prepreg is Cycom 1827 prepreg made from a thermosetting epoxy resin and HTA-7 graphite fiber. The composite made with the thermoplastic powder coated prepreg had CSAI of 34.9 ksi and UNI COMP WET at 200° F. of 218.4 ksi. For the control composite CSAI was 32.6 ksi and UNI COMP WET at 200° F. was 160.6 ksi.

EXAMPLE 11

A unidirectional fiber-reinforced resin prepreg tape is made using the thermosetting matrix resin formula described in Example 4 with the exception thet instead of 12 parts ULTEM resin, 54 parts by wt of Victrex 4800P thermoplastic polyethersulfone resin is substituted. As the reinforcing fiber, Toho HTA-7 graphite fiber is used. Resin and fiber weights in the prepreg are the same as in Example 4. For applying thermoplastic particles to the surface of the prepreg, a mixture is made of 36% by wt of the Torlon 4000 TF thermoplastic powder described in Example 8 and 64% by wt of the thermosetting matrix resin. A film of this mixture is coated on release paper at 39 grams resin mix per square meter. This film is transferred to one surface of the prepreg and the coated prepreg is laminated into a composite for testing CSAI as in Example 8. A control composite is made from the same prepreg without the film coating.

A composite from the coated prepreg has CSAI of 50.8 ksi and the control composite has CSAI of 42.4 ksi.

In the foregoing examples the fiber-reinforced prepregs were already made before the particulate thermoplastic coating was applied to the prepreg surface. Another method for making a prepreg with thermoplastic resin particles at the surface is to incorporate the resin particles into the matrix thermosetting resin which is to be used for impregnating a fiber web to make a prepreg. On application of this resin mixture to the fiber web to make the prepreg, the fluid thermosetting resin permeates the fiber web but the thermoplastic particles do not penetrate the web and they are concentrated in a thin resin layer outside the web at the surface of the prepreg. This method is illustrated in the following example.

EXAMPLE 12

To the matrix resin formulation described in Example 4 is added four percent by weight of Upilex R thermoplastic resin particles. The formulation is thoroughly mixed and coated on release paper at resin weight of 93 grams per square meter. Onto this resin film are laid parellel tows of Amoco T-300 graphite fiber, 12,000 filaments per tow, to make fiber weight of 145 grams per square meter. The fiber tows are roll-pressed into the resin films at 100° C. to form a fiber-reinforced resin prepreg. Similarly other prepregs are made using resin formulations with 7 and 10 percent by wt of the Upilex R resin particles, and with no added resin particles. Composites for testing G2c are made and tested as in Example 1 from each of these prepregs. The measured G2c for the control composite made with no thermoplastic particles is 5.94 in.-lb./in. For composites made from the formulations containing 4, 7, and 10% of Upilex R particles, the G2c values are 7.64, 9.42, and 10.5 in.-lb./sq. in., respectively. Microscopic examination of cross sections of the composites reveals discrete resin layers separating fiber layers at the planes where resin particles had been concentrated near the prepreg surfaces. No particles were seen in the fiber webs. At the particle loadings that were tested, toughness of the composites was increased as the proportion of thermoplastic particles in the resin was increased.

We claim:

1. A fiber reinforced thermosetting resin matrix prepreg having an outer resin layer apart from the reinforcing fiber at one or both surfaces of the prepreg said outer layer comprising particles of thermoplastic resin of particle size in the range from 2 to 100 microns particle diameter.

2. A prepreg defined by claim 1 wherein the amount of thermoplastic resin particles at one surface of the prepreg is in the range from two to fifteen grams per square meter.

3. A prepreg defined by claim 1 wherein the thermoplastic resin is selected from the group consisting of polyimides, polyetherimides, polyamideimide, polyamide, polyaramide, polyethersulfone, polyarylsulfone, polyether ketone, polycarbonate, polyester, polyarylene sulfide, polytetrafluoroethylene and polybenzamidazole.

4. A laminated fiber reinforced thermosetting resin composite which has been made by laminating several prepregs at least one of which is a prepreg defined by claim 1.

5. A laminated fiber reinforced resin composite comprising at least one discrete resin layer separating fiber layers in the laminated composite, said discrete resin layer comprising particles of thermoplastic resin in the matrix resin.

6. A composite defined by claim 4 wherein the amount of thermoplastic resin in the discrete resin layer separating fiber layers constitutes from 20% to 80% by volume of the discrete resin layer.

7. A method of making a fiber reinforced thermosetting resin prepreg said method comprising applying from two to fifteen grams per square meter of thermoplastic resin particles of size in the range from 2 to 100 microns particle diameter in a thin resin layer apart from the fiber at one surface of the prepreg.

* * * * *